(12) United States Patent
Mezaael

(10) Patent No.: US 11,628,786 B2
(45) Date of Patent: Apr. 18, 2023

(54) APPLYING USER PROFILE TO A VEHICLE

(71) Applicant: FORD GLOBAL TECHNOLOGIES, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 602 days.

(21) Appl. No.: 16/672,855

(22) Filed: Nov. 4, 2019

(65) Prior Publication Data
US 2021/0129780 A1    May 6, 2021

(51) Int. Cl.
| | | |
|---|---|---|
| *B60R 16/037* | (2006.01) | |
| *G06Q 40/08* | (2012.01) | |
| *B60N 2/02* | (2006.01) | |
| *H04L 67/306* | (2022.01) | |
| *H04W 76/10* | (2018.01) | |
| *H04W 4/40* | (2018.01) | |
| *B60H 1/00* | (2006.01) | |
| *H04L 65/402* | (2022.01) | |

(52) U.S. Cl.
CPC ....... *B60R 16/037* (2013.01); *B60H 1/00964* (2013.01); *B60N 2/0248* (2013.01); *G06Q 40/08* (2013.01); *H04L 65/4025* (2022.05); *H04L 67/306* (2013.01); *H04W 4/40* (2018.02); *H04W 76/10* (2018.02)

(58) Field of Classification Search
CPC ............. B60R 16/037; B60H 1/00964; B60N 2/0248; G06Q 40/08; H04L 65/4023; H04L 67/306; H04W 4/40; H04W 76/10

USPC ............................................................. 701/2
See application file for complete search history.

(56) References Cited

U.S. PATENT DOCUMENTS

| | | | | |
|---|---|---|---|---|
| 9,229,905 | B1* | 1/2016 | Penilla .................. G06Q 30/00 |
| 10,065,657 | B2* | 9/2018 | Porembski ........ B60W 50/0098 |
| 2013/0124009 | A1* | 5/2013 | Esler ..................... H04L 67/303 |
| | | | | 701/1 |
| 2014/0052345 | A1* | 2/2014 | Tobin .................... B60R 16/037 |
| | | | | 701/49 |
| 2015/0066246 | A1* | 3/2015 | Martin ................. B60R 16/037 |
| | | | | 701/2 |
| 2016/0167607 | A1* | 6/2016 | Rai ....................... B60R 16/037 |
| | | | | 705/307 |
| 2019/0077346 | A1* | 3/2019 | Pankow .............. B60R 25/2081 |
| 2019/0375354 | A1* | 12/2019 | Akella .................. B60R 16/037 |

* cited by examiner

*Primary Examiner* — Krishnan Ramesh
(74) *Attorney, Agent, or Firm* — Joseph Zane; Brooks Kushman P.C.

(57) ABSTRACT

A vehicle includes an electronic control unit (ECU); a human-machine interface (HMI); and a processor, configured to responsive to receiving a user profile from a mobile device wirelessly connected to the vehicle, identify a requested configuration associated with the user profile, responsive to verifying the requested configuration is unavailable to the vehicle, identify an alternative configuration to the requested configuration using a vehicle snapshot locally stored in the vehicle, and apply the alternative configuration, wherein the vehicle snapshot includes conversion information between the requested configuration and the alternative configuration.

16 Claims, 3 Drawing Sheets

APPLYING USER PROFILE TO A VEHICLE

TECHNICAL FIELD

The present disclosure generally relates to a vehicle system for applying user profiles. More specifically, the present disclosure relates to a vehicle system for applying user profiles using data snapshots.

BACKGROUND

A vehicle user may be associated with one or more user profiles, where the user profiles include various configurations and preferences for a vehicle. For instance, a user profile may include preset radio channels and usage-based insurance (UBI) policies customized to the specific user. A vehicle may receive a user profile from a cloud. Alternatively, the vehicle may receive the user profile from a mobile device carried by the user. However, different vehicles may vary in architecture, data, features, controllers and vehicle networks. A user profile compatible with one vehicle may not be compatible with others. This may potentially cause inconvenience to the user and/or a vehicle managing entity.

SUMMARY

In one or more illustrative embodiments of the present disclosure, a vehicle includes an electronic control unit (ECU); a human-machine interface (HMI); and a processor, configured to responsive to receiving a user profile from a mobile device wirelessly connected to the vehicle, identify a requested configuration associated with the user profile, responsive to verifying the requested configuration is unavailable to the vehicle, identify an alternative configuration to the requested configuration using a vehicle snapshot locally stored in the vehicle, and apply the alternative configuration, wherein the vehicle snapshot includes conversion information between the requested configuration and the alternative configuration.

In one or more illustrative embodiments of the present disclosure, a method for a vehicle includes responsive to establishing a wireless connection to a mobile device, receiving a user profile associated with a user from the mobile device; processing the user profile to identify a requested configuration; responsive to identifying an electronic control unit (ECU) associated with the requested configuration, querying the ECU for the requested configuration; responsive to verifying with the ECU that the requested configuration is unavailable to the vehicle, identifying an alternative configuration to the requested configuration using a vehicle snapshot locally stored in the vehicle; and applying the alternative configuration, wherein the vehicle snapshot includes a conversion table for the requested configuration and the alternative configuration.

In one or more illustrative embodiments of the present disclosure, a non-transitory computer-readable medium includes instructions, when executed by a processor of a vehicle, cause the vehicle to: responsive to establishing a wireless connection to a mobile device, receive a user profile associated with a user from the mobile device; process the user profile to identify a requested configuration; responsive to identifying an electronic control unit (ECU) associated with the requested configuration, query the ECU for the requested configuration; responsive to verifying with the ECU that the requested configuration is unavailable to the vehicle, identify an alternative configuration to the requested configuration using a vehicle snapshot locally stored in the vehicle, the vehicle snapshot includes a conversion table for the requested configuration and the alternative configuration; output the alternative configuration via a human-machine interface (HMI); responsive to receiving a user input indicative of an approval to apply the alternative configuration via the HMI, apply the alternative configuration; and update the user provide with the conversion table for the requested configuration and the alternative configuration of the vehicle snapshot, and a vehicle identification number (VIN), wherein the vehicle snapshot includes conversion table for the requested configuration and the alternative configuration.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Figure 1:
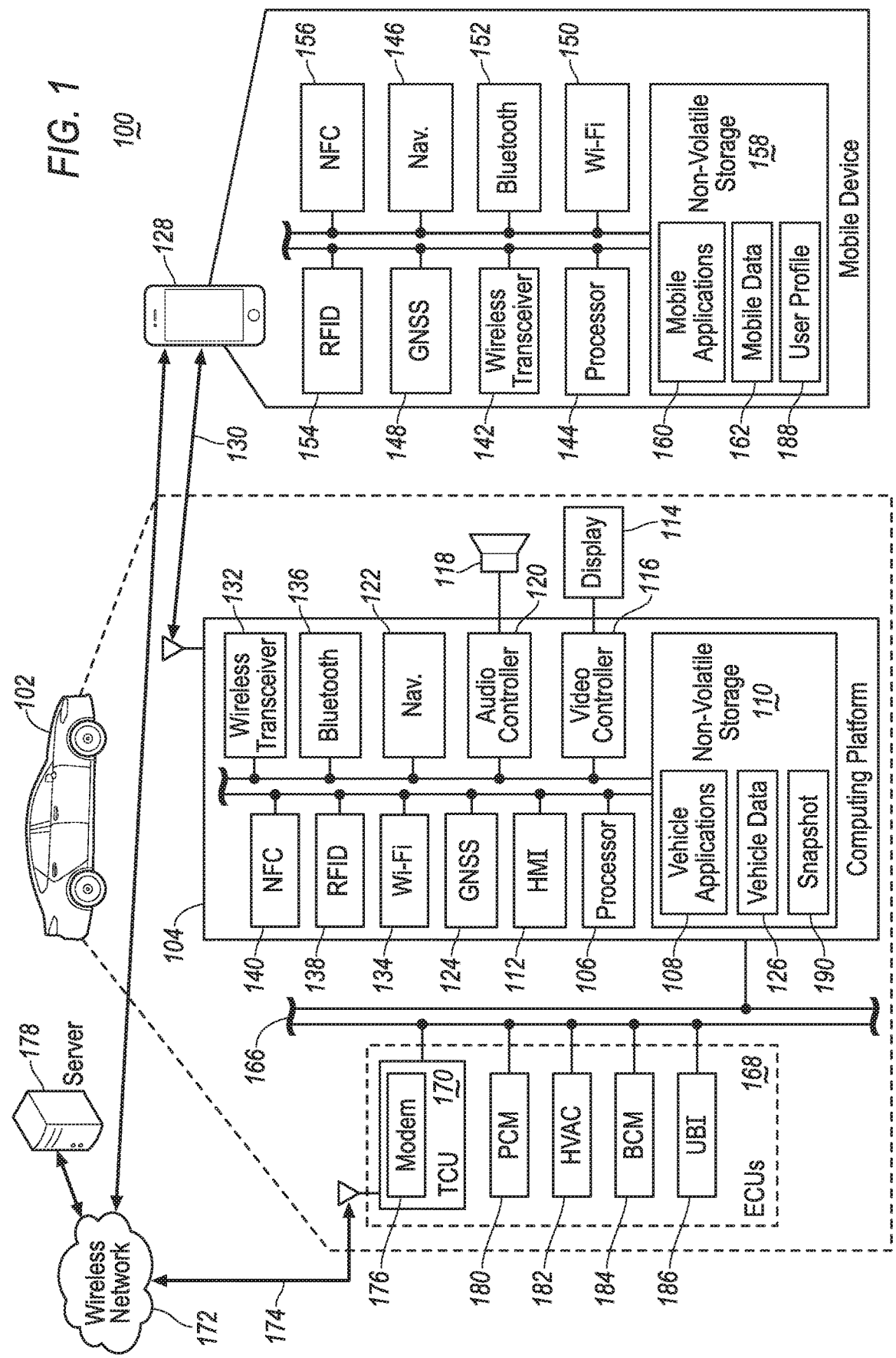
FIG. 1 illustrates an example block topology of a vehicle system of one embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle system for configuring vehicle settings using a user profile. More specifically, the present disclosure proposes a vehicle system for configuring a vehicle when one or more of a user setting is not available to that particular vehicle.

A vehicle user may be associated with a user profile including vehicle configurations/preferences of the user, such as radio presets, climate control setting, seat setting, powertrain setting, UBI configuration or the like. A vehicle may obtain the user profile from a mobile device (e.g. a smart phone) associated with the user via a wireless connection (e.g. a Bluetooth connection). Since vehicles may vary in architecture, data protocol, features, in-vehicle networks, settings/configurations available to one vehicle may not be available to another. Inconvenience may be experienced by a user when he/she switches to a new vehicle. This may be particularly true in the ride-sharing and fleet scenarios as users share multiple vehicles.

The present disclosure proposes a solution to address the above issue using vehicle snapshots. For instance, each vehicle user may have a different data set assigned and collected by fleet manager whether for specific fleet job related or for driver's specific unique profile/behavior. Fleet managers may not elect to collect much data but instead want to collect a smaller data set from one or a combination of a given vehicle, given driver, given job assignment. An application on the mobile device of the user may synchronize the user profile while the vehicle computer may govern and assess those rules and notify the fleet manager for what has been applied and what cannot be applied due to limitations or other reasons. The synchronize process may be referred to as a handshake verification between the vehicle and the mobile device. Rather than sending errors and feedback to a cloud server for further decision when features provided by the vehicle do not match the user profile, the vehicle computer system may determine appropriate alternative solution (a.k.a. vehicle data snapshot method) to provide the user with the best possible user experience.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, data processing, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as one the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, smartfobs, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, a ultra-wide band (UWB) controller (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples. Furthermore, the in-vehicle network 166, or portions of the in-vehicle network 166, may be a wireless network accomplished via Bluetooth low-energy (BLE), Wi-Fi, UWB, or the like.

The computing platform 104 may be configured to communicate with various ECUs 168 of the vehicle 102 configured to perform various options. For instance, the computing platform may be configured to communicate with a TCU 170 configured to control telecommunication between vehicle 102 and a wireless network 172 through a wireless connection 174 using a modem 176. The wireless connection 174 may be in the form of various communication network e.g. a cellular network. Through the wireless network 172, the vehicle may access one or more servers 178 to access various content for various purposes. It is noted that the terms wireless network and server are used as general terms in the present disclosure and may include any computing network involving carriers, router, computers, controllers or the like configured to store data and perform data processing functions and facilitate communication between various entities.

The ECUs 168 may further include a powertrain control module (PCM) 180 configured to provide operate powertrain of the vehicle 102. For instance, the PCM 180 may be configured adjust a drive mode (e.g. sport, comfort or the like). The ECUs 168 may further include a HVAC controller 182 configured to control a climate system of the vehicle 102. For instance, the HVAC controller 182 may be configured to operate air-conditioning (AC), heating, seat ventilation/heating or the like to provide the user with a customized cabin condition. The ECUs 168 may further include a body control module (BCM) 184 configured to operate various body operations of the vehicle 102. For instance, the BCM 184 may be configured to operate doors and windows of the vehicle 102. In some cases, the BCM 184 may be further configured to operate a blind-spot monitor feature of the vehicle 102 although such feature may be operated by other controllers for vehicles with other configurations. The ECUs 168 may further include a UBI controller 186 configured to communicate with various ECUs 168 and collect data therefrom. The UBI controller 186 may be provided with a processing and storage capabilities to perform operations including data analyzing and storage. The UBI controller 186 may be integrated with the vehicle 102. In some other examples, the UBI controller 186 may be an individual device connected to the in-vehicle network 166 via ports/connectors such as an on-board diagnostics-II (OBD-II) port.

Configurations of ECUs 168 may be manually input by a vehicle user. Additionally or alternatively, the configurations may be performed based on a user profile 188 (a.k.a. user preferences) received from the mobile device 128. The user profile 188 may be stored in the storage 158 of the mobile device 128 and may include various data associated with the vehicle user. For instance, the user profile 188 may include information of a user identity, vehicles associated with the user (e.g. vehicle identification numbers (VINs)), and/or vehicle setting/preferences of the user such as seat position settings, radio presets, climate control settings, UBI configurations, drive mode settings, or the like. Responsive to receiving the user profile 188 from the mobile device 128, the computing platform 104 may process the user profile 188 to determine specific settings for each ECU 168. Responsive to receiving the user profile 188, the computing platform 104 may use a vehicle snapshot 190 to perform a handshake verification to process the user profile 188 and determine the requested configurations. For instance, the snapshot 190 may be stored in the storage 110 of the computing platform 104 and include matching information of the user profile 188 and available features of the vehicle 102. In some cases, a specific user setting from the user profile 184 may not be available to the vehicle 102. Additionally, the computing platform 104 may use the vehicle snapshot 190 to determine an alternative solution to provide the user with the best available user experience.

Figure 2:
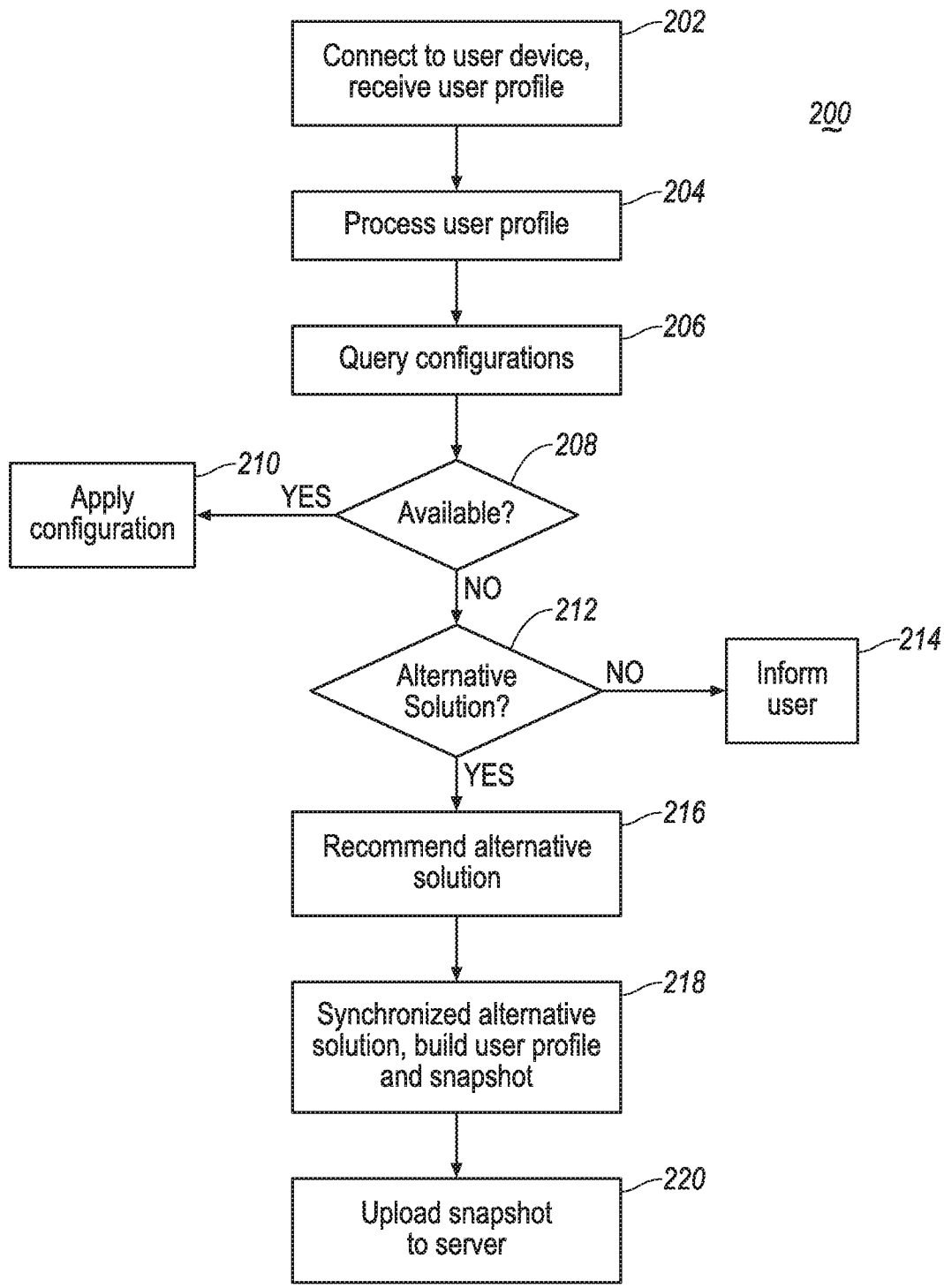
FIG. 2 illustrates an example flow diagram for a process of the vehicle system of one embodiment of the present disclosure.

Referring to FIG. 2, an example flow diagram for a process of the vehicle system of one embodiment of the present disclosure is illustrated. With continuing reference to FIG. 1, the computing platform 104 of the vehicle 102 connects to the mobile device 128 via the wireless connection 130 and receives the user profile 188 therefrom at operation 202. Responsive to receiving the user profile 188, the computing platform 104 performs the handshake verification by processing the user profile 188 to determine vehicle configuration requests associated with the user. At operation 206, the computing platform 104 queries configurations as requested to determine the availability of the configurations. For instance, the computing platform 104 may be configured to query an ECU 168 specified in a configuration request to determine if the requested configuration is available. Additionally or alternatively, the computing platform 104 may use the vehicle snapshot 190 to perform the handshake verification to determine the availability of the requested configurations or an alternative solution. If the computing platform 104 determines the requested configuration is available, the process proceeds from operation 208 to operation 210 and the requested configuration is applied via the computing platform 104 and/or one or more ECUs 168. Otherwise, if no readily available configuration is available, the process proceeds to operation 212 and the computing platform 104 verifies if an alternative solution is available using the vehicle snapshot 190 as discussed above. If no alternative solution for the requested configuration is available, the process proceeds to operation 214 and the computing platform 104 outputs a message via the HMI controls 112.

Otherwise, if the computing platform 104 determines an alternative solution is available at operation 212, the process proceeds to operation 216 and the computing platform 104 outputs a recommendation to the vehicle user via the HMI controls 112. The alternative solution may include a configuration or a feature that is not exactly the same as the requested configuration, but provides substantially the same or similar user experience. In one example, the computing platform 104 may require a user approval before synchronizing the alternative solution. Alternatively, the computing platform 104 may be configured to synchronize the alternative solution automatically without the user approval. In case that multiple alternative solutions are detected, the computing platform 104 may ask the user the choose from one of the alternative solutions to apply to the vehicle. As discussed above, a handshake verification may be performed to synchronize the user profile and the vehicle-supported configuration to provide the user with the alternative solution. During the handshake verification, the computing platform 104 may match and/or convert the user profile into the configuration supported by the vehicle 102 using the vehicle snapshot 190. The vehicle snapshot 190 may be preloaded into the vehicle 102 from a server 178 and contain rules to match and/or convert the configurations. At operation 218, the computing platform 104 synchronizes the alternative solution and build/update the user profile 188 as well as the vehicle snapshot 190. The alternative solution may be built into the user profile 188 and the vehicle snapshot 190 for future reference. At operation 220, the vehicle 102 upload the snapshot 190 as updated to the server 178 to share the alternative solution.

Figure 3:
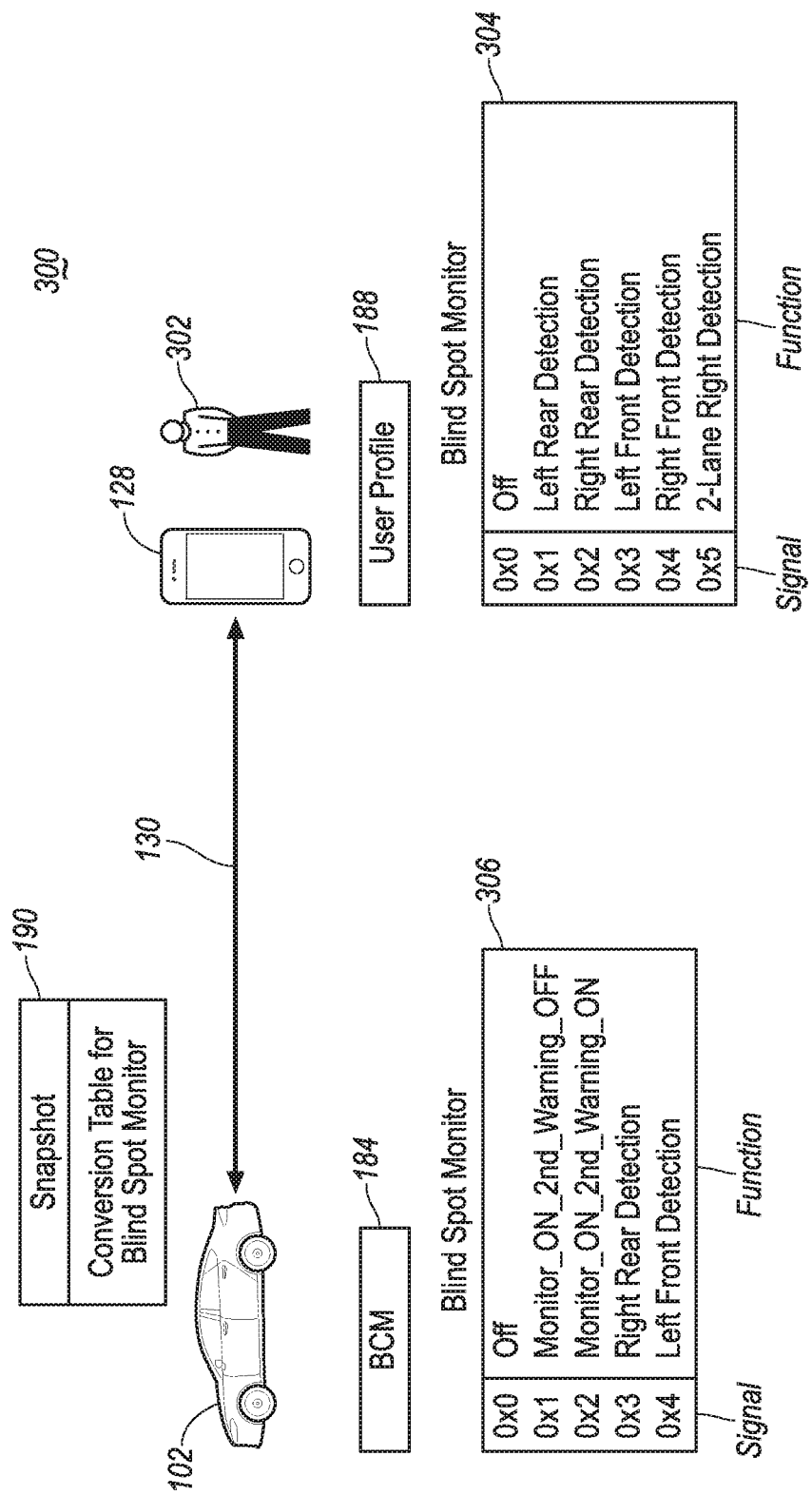
FIG. 3 illustrates an example schematic diagram of one embodiment of the present disclosure.

Referring to FIG. 3, a schematic diagram 300 of the vehicle system of one embodiment of the present disclosure is illustrated. With continuing reference to FIGS. 1 and 2, the wireless connection 130 is established as a vehicle user 302 carrying the mobile device 128 approaches the vehicle 102. The user profile 188 associated with the user 302 stored in the mobile device may be sent to the vehicle 102 vie the wireless connection 130. In the present example, the user profile may be associated with a blind spot monitor configuration 304 of a vehicle that the user 302 has previously driven (not shown). Responsive to receiving the user profile 188, the computing platform 104 of the vehicle 102 may perform the handshake verification to process the user profile 188 and identify the blind spot warning configuration 304 of the user 302. After querying the BCM 184 of the vehicle 102, the computing platform 104 may determine although the BCM 184 is in support of a blind spot monitor feature, the specific blind spot monitor configuration 306 of the BCM 184 may be different from the blind spot monitor configuration 304 of the user profile 188 as illustrated in FIG. 3. Such configuration discrepancies for the same or similar features may be common as components and data signals may vary by vehicle manufacturers. Even for the same vehicle manufacturer, specific designs and configurations may vary by vehicle models and years. The computing platform 104 may use the vehicle snapshot 190 to determine the availability of an alternative solution. In the present example, despite the discrepancy between the user blind spot monitor configuration 304 and the vehicle blind spot monitor configuration 306, the BCM 184 of the vehicle 102 may provide a limited blind spot monitor feature to the user 302. The computing platform 104 may compare and match the user blind spot monitor configuration 304 with the vehicle blind spot monitor configuration 306 using the snapshot 190 via the handshake verification to provide the alternative solution to the user 302. Additionally, the computing platform 104 may build and update the user profile 188 e.g. by adding the vehicle information (e.g. VIN, Blind spot monitor configuration 306) and the matching conversion into the user profile 188 via the wireless connection 130. Additionally, the computing platform 104 may collect data during the fleet session to monitor the usage of the blind spot monitor feature and update the vehicle snapshot 190 based on the usage. The updated snapshot 190 may be shared to other vehicles via the wireless network 172.

The example as illustrated with reference to FIG. 3 is merely an example and the present disclosure may be applied to various vehicle configurations. For instance, the vehicle snapshot 190 may be configured to synchronize vehicle settings including UBI, and fleet/driver safety score. A fleet driver may bring and synchronize the user profile 188 with the subject vehicle 102. Configurations for each vehicle may be different. For instance, in some vehicles engine hour value is calculate by an instrument cluster whereas some other vehicles provide engine hours by a different module such as the TCU. The computing platform 104 may use the vehicle snapshot 190 to synchronize the user profile 188 and provide an alternative solution.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
    an electronic control unit (ECU);
    a human-machine interface (HMI); and
    a processor, configured to
        responsive to receiving a user profile from a mobile device wirelessly connected to the vehicle, identify a requested configuration associated with the user profile, the requested configuration including a first feature,
        responsive to verifying the requested configuration is unavailable due to an absence of the first feature on the vehicle, determine an alternative configuration to the requested configuration using a vehicle snapshot locally stored in the vehicle by replacing the first feature with a second feature absent from the requested configuration and the user profile, wherein the vehicle snapshot includes conversion information between the requested configuration and the alternative configuration,
        output the alternative configuration via the HMI,
        responsive to receiving a user input indicative of an approval to apply the alternative configuration, apply the alternative configuration and activate the second feature,
        update the user profile with the mobile device to include the second feature,
        monitor the usage of the alternative configuration by the user, and update the snapshot using the alternative configuration based on the usage.

2. The vehicle of claim 1, wherein the processor is further configured to:
    query the ECU regarding the requested configuration.

3. The vehicle of claim 1, wherein the processor is further configured to:
    upload the vehicle snapshot as updated to a remote server.

4. The vehicle of claim 1, wherein the processor is further configured to:
    responsive to a plurality of alternative configurations matched to the requested configuration being identified via the vehicle snapshot, output the plurality of alternative configurations via the HMI as options; and
    receive a user input indicative of choosing one of the plurality of alternative configurations to apply.

5. The vehicle of claim 1, wherein the vehicle snapshot includes conversion information for: usage-based insurance (UBI) configuration, blind spot monitor configuration, and fleet vehicle management configuration.

6. The vehicle of claim 5, wherein the vehicle snapshot further includes conversion information for at least one of: radio configuration, heat ventilation air-conditioning configuration, powertrain configuration or vehicle seat configuration.

7. The vehicle of claim 1, wherein both the first feature and the second feature are functions of a vehicle blind spot monitoring system.

8. A method for a vehicle, comprising:
responsive to establishing a wireless connection to a mobile device, receiving a user profile associated with a user from the mobile device;
processing the user profile to identify a requested configuration;
responsive to identifying an electronic control unit (ECU) associated with the requested configuration, querying the ECU for the requested configuration, wherein the requested configuration includes a first feature;
responsive to verifying with the ECU that the requested configuration is unavailable to the vehicle, identifying a plurality of alternative configurations to the requested configuration using a vehicle snapshot locally stored in the vehicle, wherein the vehicle snapshot includes a conversion table for the requested configuration and the alternative configurations; and
responsive to a plurality of alternative configurations matched to the requested configuration being identified via the vehicle snapshot, outputting the plurality of alternative configurations via a human-machine interface (HMI) as options;
responsive to receiving a user input indicative of choosing one of the plurality of alternative configurations, applying the one of the alternative configurations, wherein the one of the alternative configurations includes a second feature absent from the requested configuration;
monitoring the usage of the one of the alternative configurations by the user and update the snapshot using the one of the alternative configurations based on the usage.

9. The method of claim 8, further comprising:
sending an update file to the mobile device to update the user profile, wherein the update file includes the conversion table for the requested configuration and the alternative configuration of the vehicle snapshot, and a vehicle identification number (VIN).

10. The method of claim 8, further comprising:
uploading the vehicle snapshot as updated to a remote server.

11. The method of claim 8, further comprising:
outputting the alternative configuration via a human-machine interface (HMI); and
receiving a user input indicative of an approval to apply the alternative configuration via the HMI.

12. The method of claim 8, wherein the vehicle snapshot includes conversion information for: usage-based insurance (UBI) configuration, blind spot monitor configuration, fleet vehicle management configuration, and a powertrain configuration.

13. The method of claim 12, wherein the vehicle snapshot further includes conversion information for at least one of: radio configuration, heat ventilation air-conditioning configuration, or vehicle seat configuration.

14. A non-transitory computer-readable medium, comprising instructions, when executed by a processor of a vehicle, cause the vehicle to:
responsive to establishing a wireless connection to a mobile device, receive a user profile associated with a user from the mobile device;
process the user profile to identify a requested configuration including a first feature;
responsive to identifying an electronic control unit (ECU) associated with the requested configuration, query the ECU for the requested configuration;
responsive to verifying with the ECU that the requested configuration is unavailable to the vehicle, identify an alternative configuration to the requested configuration using a vehicle snapshot locally stored in the vehicle, wherein the vehicle snapshot includes a conversion table for the requested configuration and the alternative configuration, the alternative configuration includes a second feature absent from the requested configuration;
output the alternative configuration via a human-machine interface (HMI);
responsive to receiving a user input indicative of an approval to apply the alternative configuration via the HMI, apply the alternative configuration;
update the user profile with the conversion table for the requested configuration and the alternative configuration of the vehicle snapshot, and a vehicle identification number (VIN); and
monitor the usage of the alternative configuration by the user, and update the snapshot using the alternative configuration based on the usage,
wherein the vehicle snapshot includes conversion table for the requested configuration and the alternative configuration.

15. The non-transitory computer-readable medium of claim 14, further comprising instructions, when executed by the processor of the vehicle, cause the vehicle to:
responsive a plurality of alternative configurations matched to the requested configuration being identified via the vehicle snapshot, outputting the plurality of alternative configurations via the HMI as options; and
receiving a user input indicative of choosing one of the plurality of alternative configurations to apply.

16. The non-transitory computer-readable medium of claim 14, further comprising instructions, when executed by the processor of the vehicle, cause the vehicle to:
monitor a usage of the alternative configuration by the user;
update the vehicle snapshot based on the usage as monitored; and
upload the vehicle snapshot as updated to a remote server.

* * * * *